(12) United States Patent
Yasuma

(10) Patent No.: US 10,033,886 B2
(45) Date of Patent: Jul. 24, 2018

(54) COMMUNICATION APPARATUS, AND CONTROL METHOD, COMMUNICATION SYSTEM, AND STORAGE MEDIUM THEREOF

(71) Applicant: CANON KABUSHIKI KAISHA, Tokyo (JP)

(72) Inventor: Kensuke Yasuma, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/175,624

(22) Filed: Jun. 7, 2016

(65) Prior Publication Data
US 2016/0360048 A1 Dec. 8, 2016

(30) Foreign Application Priority Data
Jun. 8, 2015 (JP) ................................ 2015-116026

(51) Int. Cl.
  *G06F 3/12* (2006.01)
  *H04N 1/00* (2006.01)
  *G06K 9/00* (2006.01)

(52) U.S. Cl.
  CPC ..... *H04N 1/00244* (2013.01); *G06K 9/00355* (2013.01); *G06K 9/00624* (2013.01); *H04N 1/00249* (2013.01); *H04N 1/00251* (2013.01); *H04N 2201/0039* (2013.01)

(58) Field of Classification Search
  None
  See application file for complete search history.

(56) References Cited

U.S. PATENT DOCUMENTS

| | | | | |
|---|---|---|---|---|
| 6,782,241 B2* | 8/2004 | Kobayashi | ............ | H04W 76/14 455/88 |
| 7,738,128 B2* | 6/2010 | Itoh | .................... | H04N 1/00204 358/1.15 |
| 9,055,388 B2* | 6/2015 | Lee | ........................ | H04W 8/005 |
| 9,112,580 B2* | 8/2015 | Kim | ........................ | H04B 7/26 |
| 9,258,768 B2* | 2/2016 | Jung | .................... | H04W 76/023 |
| 9,258,841 B2* | 2/2016 | Kim | .................... | H04W 76/066 |
| 2013/0148149 A1* | 6/2013 | Park | ...................... | G06F 3/1296 358/1.13 |
| 2013/0273850 A1* | 10/2013 | Kim | .................... | H04W 76/066 455/41.2 |
| 2014/0104443 A1* | 4/2014 | Takahashi | .......... | H04N 1/00347 348/207.1 |

(Continued)

FOREIGN PATENT DOCUMENTS

JP    2008-305103 A    12/2008

*Primary Examiner* — Dung D Tran
(74) *Attorney, Agent, or Firm* — Carter, DeLuca, Farrell & Schmidt, LLP

(57) ABSTRACT

A communication apparatus comprises a first obtaining unit configured to obtain a captured image; a recognizing unit configured to recognize another communication apparatus from within the captured image obtained by the first obtaining unit; and a transmitting unit configured to, in a case where a plurality of other communication apparatuses were recognized by the recognizing unit, transmit to the plurality of other communication apparatuses a predetermined instruction whereby the plurality of other communication apparatuses connect to each other or disconnect from each other.

17 Claims, 13 Drawing Sheets

(56) References Cited

U.S. PATENT DOCUMENTS

| | | | |
|---|---|---|---|
| 2014/0211026 A1* | 7/2014 | Sakai | H04W 8/005 |
| | | | 348/207.2 |
| 2015/0002890 A1* | 1/2015 | Okuno | G06F 3/1294 |
| | | | 358/1.15 |
| 2015/0229627 A1 | 8/2015 | Yasuma | |
| 2016/0139720 A1* | 5/2016 | Kritt | G06F 3/0416 |
| | | | 345/173 |

* cited by examiner

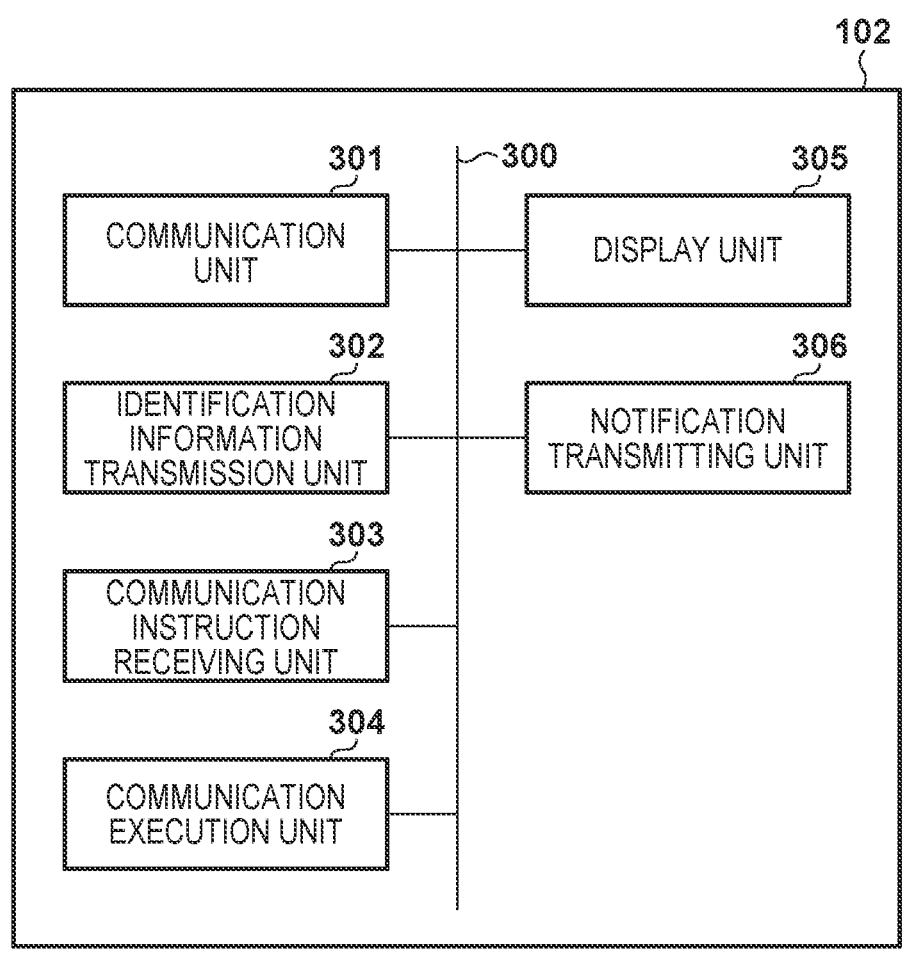

COMMUNICATION APPARATUS, AND CONTROL METHOD, COMMUNICATION SYSTEM, AND STORAGE MEDIUM THEREOF

BACKGROUND OF THE INVENTION

Field of the Invention

The present invention relates to a communication apparatus, and a control method, a communication system, and a storage medium of the communication apparatus.

Description of the Related Art

Communication apparatuses such as cameras and printers have become able to connect to the internet, infrastructure networks, or ad hoc networks. For example, when desired to perform communications between a camera and a printer, connection settings of an infrastructure network or an ad hoc network are performed by operating one among the camera and the printer, or alternatively by operating both communication apparatuses. In WPS (Wi-Fi Protected Setup), which is a system of performing wireless simple settings, a connection is realized by simultaneously pushing a button of each communication apparatus.

In WPS, the method of operating the button that needs to be pushed differs for each communication apparatus, so it is not possible to connect by performing a simple operation. Further, for example in a case where it is desired to connect to a projector installed in the ceiling of a conference room, it is difficult to physically push a button. Also, there is the problem that in a case where buttons have been pushed simultaneously, a connection may be established with an unintended communication apparatus.

On the other hand, in Japanese Patent Laid-Open No. 2008-305103, technology is disclosed in which a device existing in the real world is recognized, and content is transmitted simply to a single apparatus.

However, in the technology described in Japanese Patent Laid-Open No. 2008-305103, although content can be transmitted after connecting to a single device, it is not possible for a plurality of devices existing in front of a user to be simply connected to or disconnected from each other.

The present invention has been made in consideration of the above problems, and provides technology for desired communication apparatuses to be simply connected to or disconnected from each other.

SUMMARY OF THE INVENTION

According to one aspect of the present invention, there is provided a communication apparatus, comprising: a first obtaining unit configured to obtain a captured image; a recognizing unit configured to recognize another communication apparatus from within the captured image obtained by the first obtaining unit; and a transmitting unit configured to, in a case where a plurality of other communication apparatuses were recognized by the recognizing unit, transmit to the plurality of other communication apparatuses a predetermined instruction whereby the plurality of other communication apparatuses connect to each other or disconnect from each other.

Further features of the present invention will become apparent from the following description of exemplary embodiments with reference to the attached drawings.

BRIEF DESCRIPTION OF THE DRAWINGS

FIG. 3 shows an exemplary module configuration of a camera according to an embodiment of the present invention.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Embodiment 1

1. Configuration of Communication System

Figure 1:
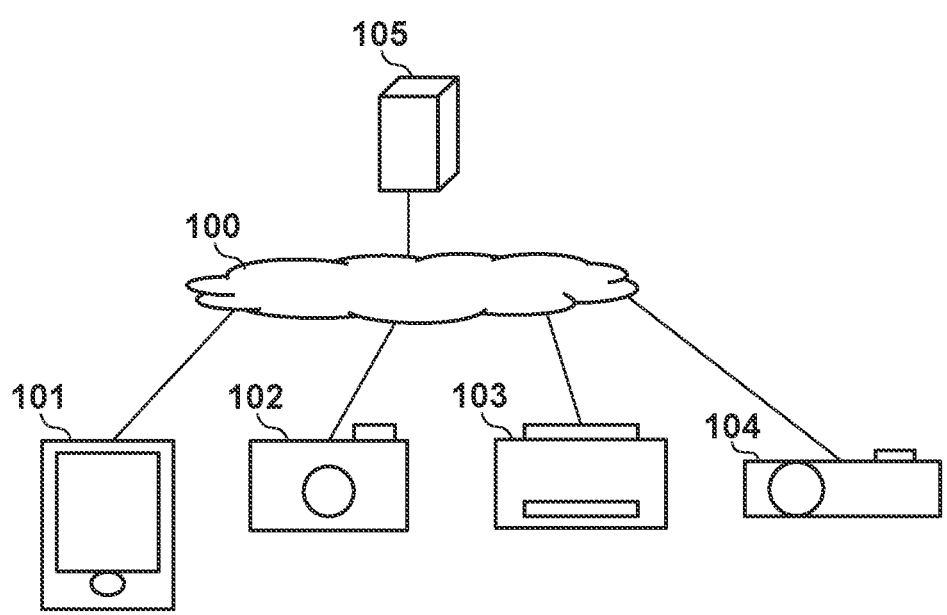
FIG. 1 shows an exemplary configuration of a communication system according to an embodiment of the present invention.

FIG. 1 shows an exemplary configuration of a communication system according to an embodiment of the present invention. Reference numeral 100 denotes a network to which a later-described communication apparatus 101, a camera 102, a printer 103, a projector 104, and a server 105 can be connected. The network 100 in the present embodiment can be realized also by a combination of the internet, a WAN (Wide Area Network), a LAN (Local Area Network), and the like.

Reference numeral 101 denotes a communication apparatus configured to be connected to the network 100. The communication apparatus 101 recognizes the camera 102, the printer 103, the projector 104 (referred to below as devices), and the like, and instructs a plurality of devices that have been designated by a predetermined operation by a user to execute a network connection and an application connection. Reference numeral 102 denotes a camera configured to be connected to the network 100. Reference numeral 103 denotes a printer configured to be connected to the network 100. Reference numeral 104 denotes a projector configured to be connected to the network 100. The camera 102, the printer 103, and the projector 104 execute a network connection and an application connection in response to a connection instruction from the communication apparatus 101.

Reference numeral 105 denotes a server configured to be connected to the network 100. The server 105 manages recognition information for the communication apparatus 101 to recognize devices, and attribute information displayed in a screen after recognition. The server 105 provides recognition information and attribute information in response to a request from the communication apparatus 101. The server 105 receives recognition information and attribute information from each device. In the present embodiment, the server 105 is embodied as a server, but this is not a limitation, and the server 105 may also be an application configured to be provided in the cloud or on an application platform, or the server 105 may be a portable telephone or a network storage.

2. Configuration of Communication Apparatus 101

Figure 2:
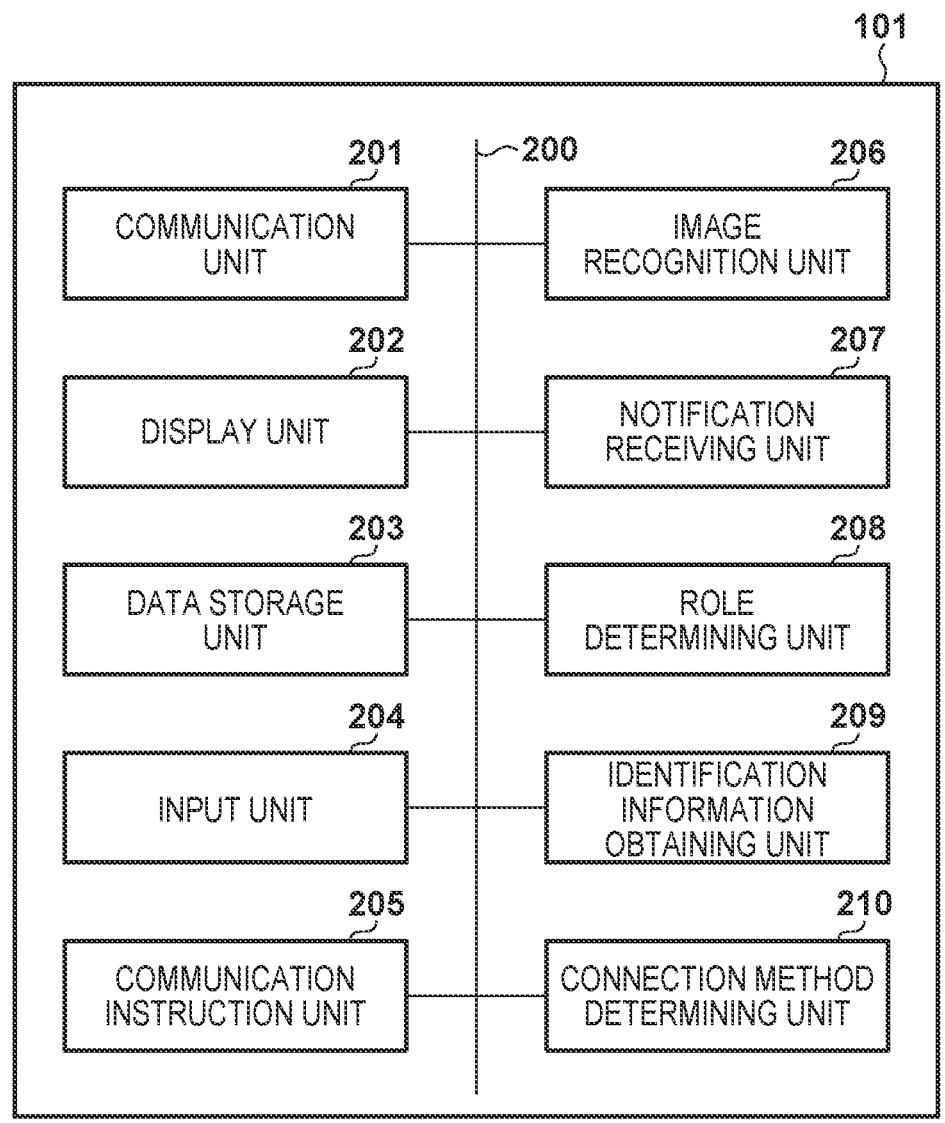
FIG. 2 shows an exemplary module configuration of a communication apparatus according to an embodiment of the present invention.

FIG. 2 shows an exemplary module configuration of the communication apparatus 101 according to an embodiment of the present invention. Reference numeral 200 denotes a bus where each module can be connected. Reference numeral 201 denotes a communication unit that performs TCP/IP processing. Reference numeral 202 denotes a display unit that performs display of a user interface, and display indicating connection completion or a connection error. The display unit 202 performs display using a liquid crystal panel or LEDs (Light Emitting Diodes). In the present embodiment, an example is described in which display indicating connection completion or a connection error is performed, but this is not a limitation, and a configuration may also be adopted in which the communication apparatus 101 notifies the user of connection completion or a connection error or the like using sound, vibration, or the like.

Reference numeral 203 denotes a data storage unit for holding recognition information or attribute information. Reference numeral 204 denotes an input unit where the user inputs instructions for device connection and disconnection through the user interface. The input unit 204 can be realized, for example, with input by performing a gesture on the touch panel or in space, linked with the display unit 202. The user interface has at least one function among pinch in, pinch out, drag, drop, swipe, and touch. Reference numeral 205 denotes a communication instruction unit that instructs a device to connect to or disconnect from the network 100 or an application.

Reference numeral 206 denotes an image recognition unit that discriminates the position of a device from a captured image that has been obtained by an image capturing unit (not shown in the drawings). The communication apparatus 101 may also include the image capturing unit. Reference numeral 207 denotes a notification receiving unit that receives notification of a change in state such as connection and disconnection from a device or the server 105. Reference numeral 208 denotes a role determining unit that determines a communication role. For example, in the case of a wireless connection there are source and sink roles, and in the case of an application there are server and client roles. The roles may be determined by a procedure such as a designation order or an instruction method of the input unit 204 (for example, in a case of instruction by the thumb and index finger, the thumb determines the source).

Reference numeral 209 denotes an identification information obtaining unit that obtains recognition information and attribute information of a device. The identification information obtaining unit 209 receives an identifier that has been issued using a beacon, Bluetooth (registered trademark), or the like (to be used in recognition processing by the image recognition unit 206) from a device, and obtains recognition information and attribute information that corresponds to the identifier from the server 105. Also, the identification information obtaining unit 209 may obtain recognition information and attribute information directly from a device. Reference numeral 210 denotes a connection method determining unit that determines the connection method by judging, according to the input method of the input unit 204, whether an instruction is a connection instruction or a disconnection instruction and whether a connection is a wireless network connection or an application connection.

The function of each processing unit is realized by an unshown control unit (for example, a CPU), for example, reading out a program stored in a data storage unit and executing the program.

3. Configuration of Camera 102

FIG. 3 shows an exemplary module configuration of the camera 102 according to an embodiment of the present invention. Reference numeral 300 denotes a bus where each module can be connected. Reference numeral 301 denotes a communication unit that performs TCP/IP processing. Reference numeral 302 denotes an identification information transmission unit that transmits identification information for obtaining recognition information and attribute information of the camera 102. The identification information transmission unit 302 transmits an identifier to the nearby communication apparatus 101 using a beacon, Bluetooth (registered trademark) or the like. Note that the transmission method may also be realized using broadcast transmission, multicast transmission, or the like. The camera 102 registers the recognition information and attribute information in the server 105.

Note that in the present embodiment, an example is described in which the camera 102 performs registration, but this is not a limitation, and a configuration may also be adopted in which information that has been registered in advance is used, or in which information is registered or changed by another device such as a PC, a tablet, or a smartphone. Also, in the present embodiment, the identification information transmission unit 302 transmits the identifier, but this is not a limitation, and a configuration may also be adopted in which at least part of the recognition information or attribute information is transmitted. Also, an example is described in which information is obtained from the server 105, but this is not a limitation, and a configuration may also be adopted in which information is obtained through another device, or in which information held as a cache is used.

Reference numeral 303 denotes a communication instruction receiving unit that receives a communication instruction from the communication apparatus 101. The communication instruction receiving unit 303 receives a communication instruction from the communication apparatus 101 using a communication over Wi-Fi (registered trademark), Bluetooth (registered trademark) or the like. Note that this is not a limitation, and a configuration may also be adopted in which the communication instruction receiving unit 303 receives a communication instruction from the communication apparatus 101 through the server 105, or in which a communication instruction is received through another apparatus such as a PC, a tablet, or a smartphone.

Reference numeral 304 denotes a communication execution unit that analyzes a received communication instruction, and executes communication processing according to the communication instruction. The communication instruction here includes at least some of wireless connection starting or disconnection, discovery protocol starting or disconnection, and application starting or disconnection. Here, the discovery protocol is a protocol for finding a nearby device, such as SSDP (Simple Service Discovery Protocol) or multicast DNS.

Reference numeral 305 denotes a display unit for displaying to the user whether or not a communication instruction was received, whether or not a communication instruction was completed, or the like. In the present embodiment, these matters are communicated to the user by a display unit, but this is not a limitation, and they may also be communicated to the user by another method such as sound or vibration.

Also, when a communication instruction has been received, security when starting communication can be improved by displaying a window or the like for selecting whether or not to accept the instruction. Thus, it is possible to reduce the possibility of the communication apparatus 101 sending a communication instruction to an unintended device and causing an unintended operation. Also, by notifying the user prior to connection of a communication instruction and the communication state, it is possible for the user to judge at an early stage which communication apparatuses will be connected to each other.

Reference numeral 306 denotes a notification transmitting unit that notifies the communication apparatus 101 of completion of a communication instruction, changing of the communication state, or the like. The notification transmitting unit 306, for example, when a wireless connection is established with a device that has received a communication instruction, transmits a notification indicating that a connection has completed to the communication apparatus 101. Note that this is not a limitation, and notification of disconnection of a wireless connection may be transmitted, or notification of completion or ending of an application or the like may be transmitted.

4. Processing Executed by Communication Apparatus 101

Figure 4A:
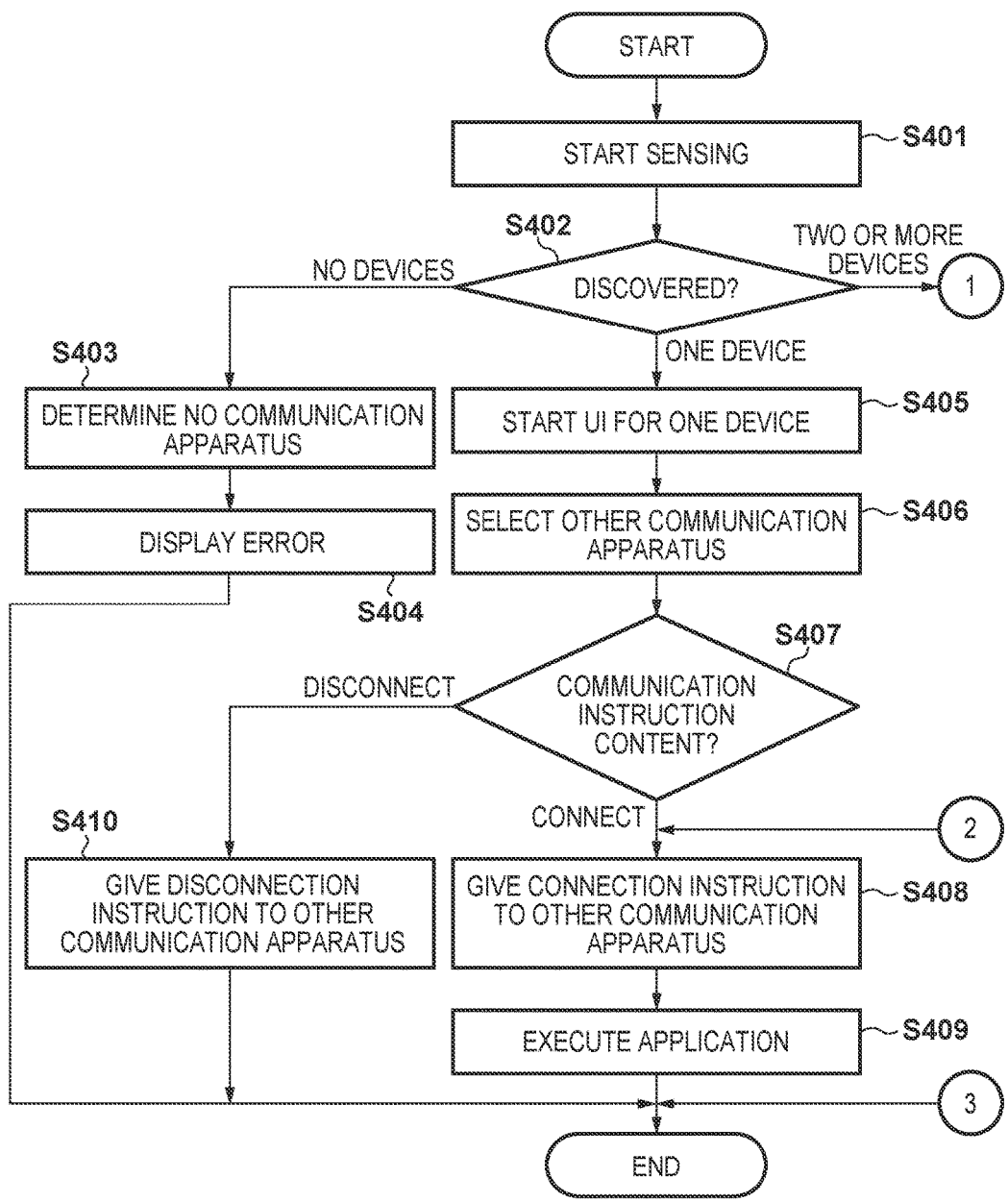
FIGS. 4A and 4B are flowcharts that show a processing procedure when performing instructions for a communication apparatus according to an embodiment of the present invention to connect to and disconnect from another communication apparatus.
Figure 4B:
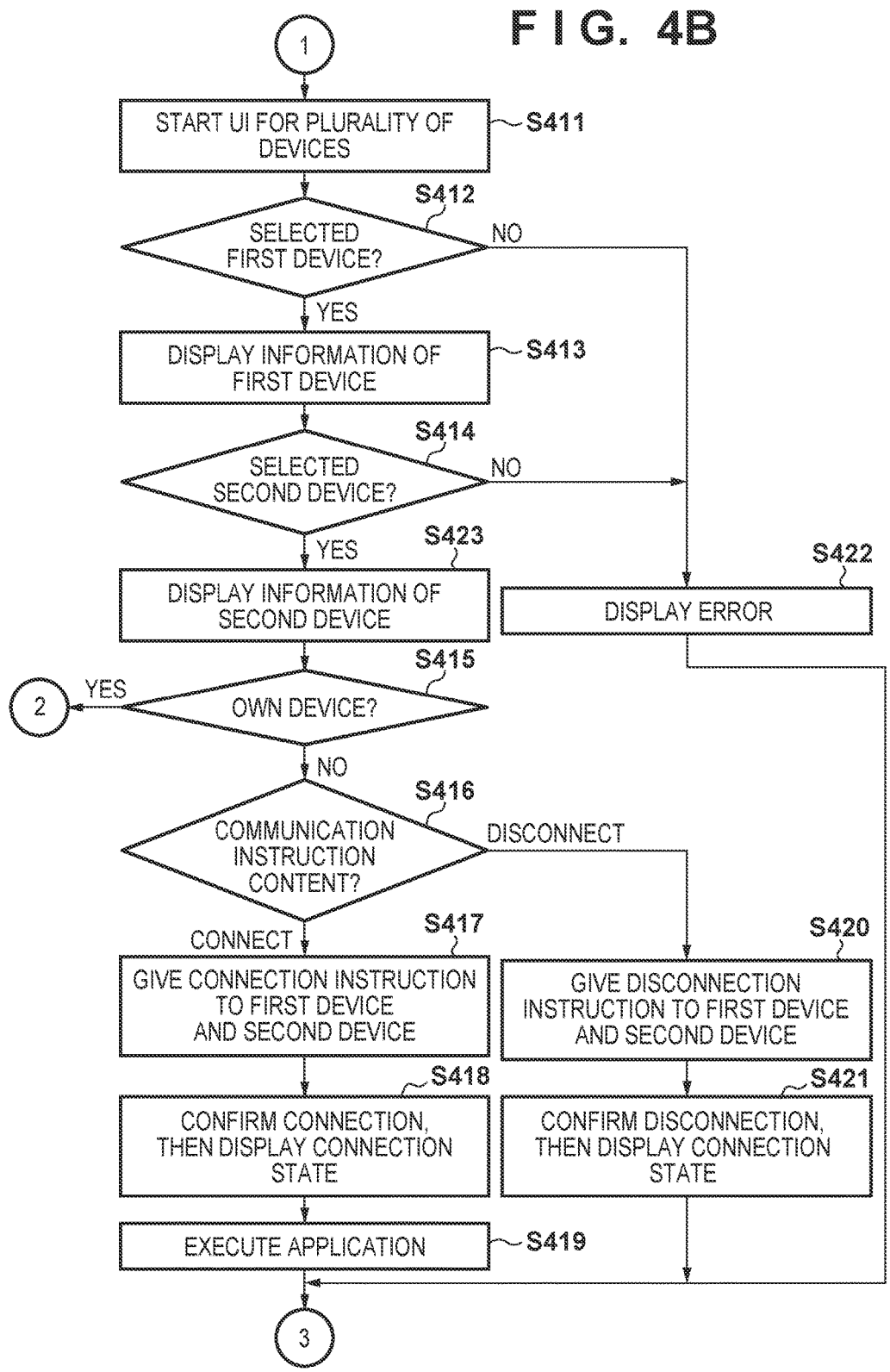

FIGS. 4A and 4B are flowcharts that show a processing procedure when performing instructions for the communication apparatus 101 to connect to and disconnect from another communication apparatus.

The identification information obtaining unit 209 starts sensing for finding a device present nearby using Wi-Fi (registered trademark) or Bluetooth (registered trademark) (Step S401). In the present embodiment, Wi-Fi (registered trademark) or Bluetooth (registered trademark) is used, but this is not a limitation, and a configuration may also be adopted in which another communication method such as Zigbee (registered trademark) or millimeter wave communication is used, or in which a device is found by performing an image search from image capture information. Also, the identification information obtaining unit 209 can also be realized using another sensor function such as a temperature sensor or radar. The identification information obtaining unit 209 searches for a device for a fixed period of time. The identification information obtaining unit 209 obtains recognition information and attribute information from the server 105 based on an obtained identifier. The data storage unit 203 stores the recognition information and attribute information associated with the identifier.

The image recognition unit 206 determines how many devices were discovered within an image being displayed using identification information (Step S402). The identification information includes at least an image characteristic amount, and is used in order for the image recognition unit 206 to determine which region within the image another communication apparatus is present.

When the identification information obtaining unit 209 determined that no devices were discovered in Step S402, processing proceeds to processing for a case where a device was not discovered (Step S403), an error is displayed (Step S404), and processing is ended.

When the identification information obtaining unit 209 determined that one device was discovered in Step S402, the display unit 202 starts display of a user interface for one device (Step S405). The user or the system selects the other communication apparatus being displayed in the display unit 202 through the input unit 204 (step S406). The display unit 202 displays communication instruction content, and the user or the system inputs the communication instruction content through the input unit 204. The connection method determining unit 210 determines the communication instruction content that was input (Step S407).

When the communication instruction content that was input in step S407 is a connection instruction, the communication instruction unit 205 instructs the other communication apparatus that was selected to establish a wireless connection, and starts up a wireless connection function included in the communication apparatus 101 to start a wireless connection (Step S408). At this time, the role determining unit 208 may determine whether the communication role is sink or source according to the selection order of the instruction that was selected. When it is not possible to determine whether the communication role is sink or source according to the function of the wireless layer, the display unit 202 performs display indicating that the role could not be determined. In the present embodiment, an example is given of determining roles of wireless sink and source, but this is not a limitation, and roles of server and client in an application may also be determined. In this case, the roles of server and client when executing an application described later are set. Also, in the present embodiment roles are determined according to selection order, but this is not a limitation, and roles may be determined by the input method of the user. For example, roles can be determined with the thumb determining sink and the index finger determining source, or the like.

The communication instruction unit 205 instructs the other communication apparatus that was selected to perform application execution, and starts up an application included in the communication apparatus 101 to start application execution (Step S409). Note that in the present embodiment, an instruction to connect the wireless layer and the application layer is described, but this is not a limitation, and the present invention is also applicable to a search protocol (SSDP, multicast DNS), a secure connection (IPsec, TLS, HTTPS), or the like.

When the communication instruction content that was input in step S407 is a disconnection instruction, the communication instruction unit 205 instructs the other communication apparatus that was selected to disconnect. The other communication apparatus and the communication apparatus 101, after ending the application, perform wireless disconnection (Step S410). Note that this is not a limitation, and processing to end a search protocol or a secure connection may also be performed.

When the identification information obtaining unit 209 determined that two devices were discovered in Step S402, the display unit 202 starts display of a user interface for two or more devices (Step S411). The input unit 204 determines whether a first device has been selected (Step S412). The user touches the first device using a touch panel or the like. The display unit 202 displays attribute information of the first device superimposed on the first device of a screen (Step S413). Note that when the first device has not been selected, the display unit 202 displays an error, and ends processing.

The input unit 204 determines whether a second device has been selected (Step S414). The user touches the second device using a touch panel or the like. The display unit 202 displays attribute information of the second device superimposed on the second device of a screen (Step S423). Note that when the second device has not been selected, the display unit 202 displays an error, and ends processing.

The user may touch one device at a time using a touch panel or the like, or may use a gesture such as pinch in, drag and drop, flicking, or the like. The first device and the second device are determined according to which finger is being used to press, or the order of which device is dragged and dropped onto which device. In this example connection is performed using the first device in the sink role and the second device in the source role, but this is not a limitation, and the roles may be reversed. Also, the server and client roles may be determined in the application layer, or search destination and search source roles may be determined in a search protocol.

Thus, it is possible to determine communication roles according to input of the user. Further, in a case where communication roles of each device have been described in the attribute information, judgment is performed including the attribute information. For example, when an impossible combination (such as when a device that can only be used in the source role was designated to the sink role) was designated, an error is displayed with the display unit 202. Also, an alternative possible combination may be proposed, or execution may be performed after exchanging the source and sink roles. In a case where source and sink roles were exchanged, display indicating that the source and sink roles were exchanged is performed in the display screen, and permission for the exchange may be sought from the user.

The role determining unit 208 determines whether or not the designation destinations of the first device and the second device are the communication apparatus 101 (Step S415). When the role determining unit 208 determines that the communication apparatus 101 was designated, processing proceeds to Step S408. When the role determining unit 208 determines that the designation destinations of the first device and the second device are both another communication apparatus, processing proceeds to Step S416.

The display unit 202 displays the communication instruction content, and the user or the system inputs the communication instruction content through the input unit 204. The connection method determining unit 210 determines the communication instruction content that was input (Step S416). For example, in the case of a pinch in or drag and drop gesture, a connection is executed. For example, in the case of a pinch out or swipe gesture, or performing a manual operation between other communication apparatuses or performing a flick gesture on another communication apparatus, disconnection is executed. Thus, the connection method may be determined in association with the user interface. Also, processing may be implemented by determining connection to the wireless layer or connection to the application layer according to these input methods.

The communication instruction unit 205 transmits a connection instruction to the first other communication apparatus and the second other communication apparatus (Step S417). The connection instruction includes wireless connection content and application execution content. For example, in the case of a wireless connection, an instruction to press a WPS button is transmitted to the first other communication apparatus and the second other communication apparatus, and a connection is directly established.

Also, a PIN code may be transmitted to the first other communication apparatus and the second other communication apparatus. Thus, the first other communication apparatus and the second other communication apparatus can establish a Wi-Fi connection by the WPS method. This is not a limitation, and a communication instruction and parameters for the first other communication apparatus and the second other communication apparatus to connect may be transmitted. Also, a communication instruction and parameters for the first other communication apparatus and the second other communication apparatus to connect to the same access point may be transmitted. The access point may be included within the communication apparatus 101, or may be an access point to which the communication apparatus 101 connects, or may be another access point to which the communication apparatus 101 is not connected.

When the wireless connection of the first other communication apparatus and the second other communication apparatus is completed, the notification receiving unit 207 receives a wireless connection complete notification from each other communication apparatus. Afterward, based on these notifications, the display unit 202 performs display indicating that the wireless connection has been completed (Step S418).

Then, the first other communication apparatus and the second other communication apparatus execute an application (Step S419). As in the case of a wireless connection, after the notification receiving unit 207 receives an application connection complete notification, the display unit 202 may perform display indicating that the application connection has completed. In the present embodiment, an example is described in which wireless connection complete and application connection complete are displayed separately, but this is not a limitation, and these may be displayed together. Also, a communication instruction of a wireless connection and a communication instruction of an application connection may be transmitted separately, or they may be transmitted together. Also, another communication instruction, such as a communication instruction of another search protocol, may be sent. When an error occurred in Step S418, processing is ended without executing an application, and the display unit 202 displays an error. Also, when an error occurred in Step S419, application execution is stopped, the communication instruction unit 205 instructs disconnection of the wireless connection, and the display unit 202 displays an error.

When the communication instruction content indicates disconnection in Step S416, the communication instruction unit 205 transmits a disconnection instruction to the first other communication apparatus and the second other communication apparatus (Step S420). The first other communication apparatus and the second other communication apparatus receive the disconnection instruction, and perform processing to end the application and processing to end the wireless connection. The notification receiving unit 207 receives notification that disconnection was completed from the first other communication apparatus and the second other communication apparatus, and the display unit 202 performs display indicating completion (Step S421). In the present embodiment, the disconnection notification is performed only once, but notification may also be given separately for each layer processing, such as when processing to end the application is completed and when processing to end the wireless connection is completed.

As described above, it is possible to switch the user interface according to the number of devices that were discovered, so the user can simply perform connection. Also, usability improves because the user can know attribute information of a device that is currently connected.

Note that in the present embodiment, connection or disconnection is determined according to the input method, i.e. pinch in or pinch out gestures, but this is not a limitation, and a configuration may also be adopted in which, for example, the user selects between connection and disconnection items after selecting the other communication apparatus.

5. User Interface Example (Connection)

FIGS. 5A to 5D show an example of a user interface in a case where a connection instruction is performed from the communication apparatus 101. Reference numeral 501 denotes a screen of the communication apparatus 101. The camera 102 and the printer 103 that were recognized through the image recognition unit 206 are displayed on the screen 501. Reference numeral 502 denotes a hand of the user that performs a pinch in gesture on the camera 102 and the printer 103 using the user interface on the communication apparatus 101. Reference numeral 503 denotes a window that displays attribute information of the camera 102. Reference numeral 504 denotes a window that displays attribute information of the printer 103. The attribute information includes a device name, a device type, abilities, name of a network to which the device is connected, name of a service that can be used, and the like. The attribute information that has been associated with the identifiers of the camera 102 and the printer 103 is obtained from the server 105, and the display unit 202 displays the attribute information in Step S413 and Step S423.

Figure 5A:
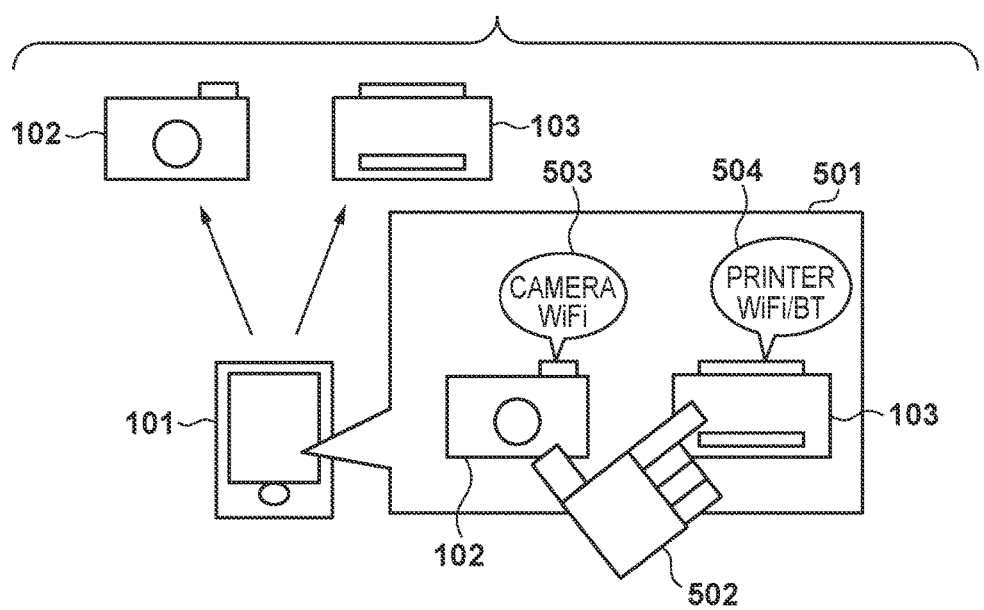
FIGS. 5A to 5D show a user interface in a case where a connection instruction is performed from a communication apparatus according to an embodiment of the present invention.

FIG. 5A shows the manner in which the user performs a pinch in gesture on the camera 102 and the printer 103 to send a connection instruction. Windows 503 and 504 show information of the destination device to be instructed. Thus, the user can easily select which device will be connected to which device.

According to the pinch in gesture, the camera 102 and the printer 103 perform a wireless connection, and afterward perform application execution. In the present embodiment, an example is described in which settings such as what sort of wireless connection to execute or what sort of application to execute are not performed, but rather execution is performed automatically. This is not a limitation, and a configuration may also be adopted in which the user further instructs which wireless method to use, such as Wi-Fi (registered trademark) or Bluetooth (registered trademark) for example. When the user performs connection of the camera 102 and the printer 103, the sink role is designated by operation of the thumb and the source role is designated by operation of the index finger.

In the present embodiment, the role is determined according to the type of finger, but a configuration may also be adopted in which, regardless of the type of finger, the role is determined by the order of selection, or the role is determined by the manner of movement when performing the pinch in gesture. Thus, it is possible to determine directionality of a connection between devices. Also, an application executed between the camera 102 and the printer 103 may further be instructed. The directionality of a connection between devices is applicable not only to a wireless connection, but also to an application. For example, a configuration may also be adopted in which according to the touching method, the server role is designated by operation of the thumb and the client role is designated by operation of the index finger.

Figure 5B:
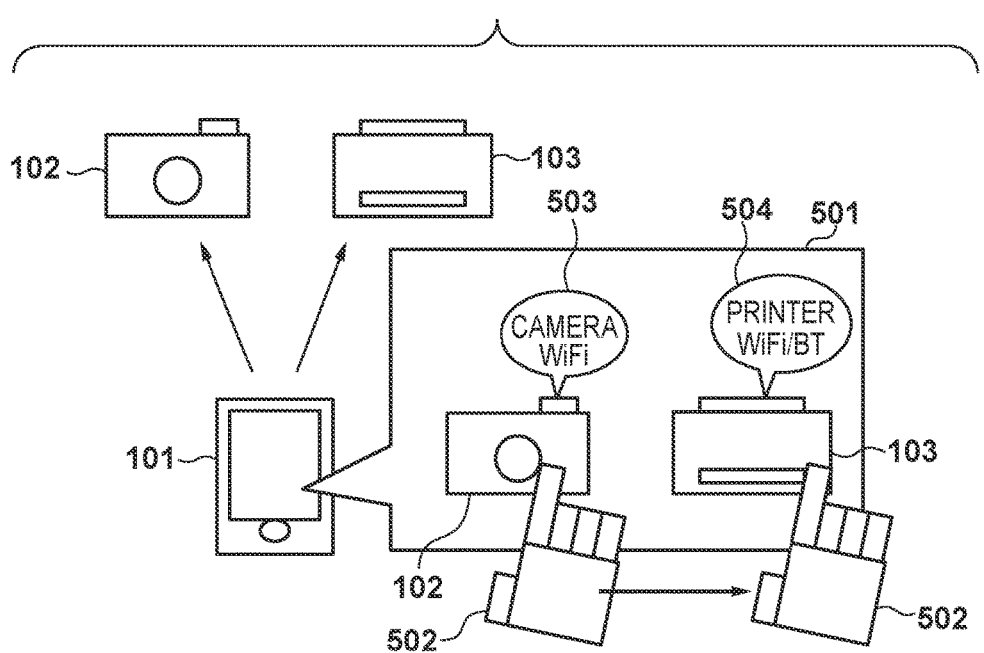

FIG. 5B shows a modified example when connecting the camera 102 and the printer 103. In this case, which device to connect is determined by touching the camera 102 and then the printer 103 in order. Which device to connect may also be determined after touching the wireless method or application. For example, the device touched first may be designated for the sink role, and the device touched afterward designated for the source role. In the case of an application, the device touched first may be designated for the server role, and the device touched afterward designated for the client role. Also, the user may drag and drop the camera 102 onto the printer 103 (drag and drop). Also, which device to connect may be determined according to that drag and drop operation.

Figure 5C:
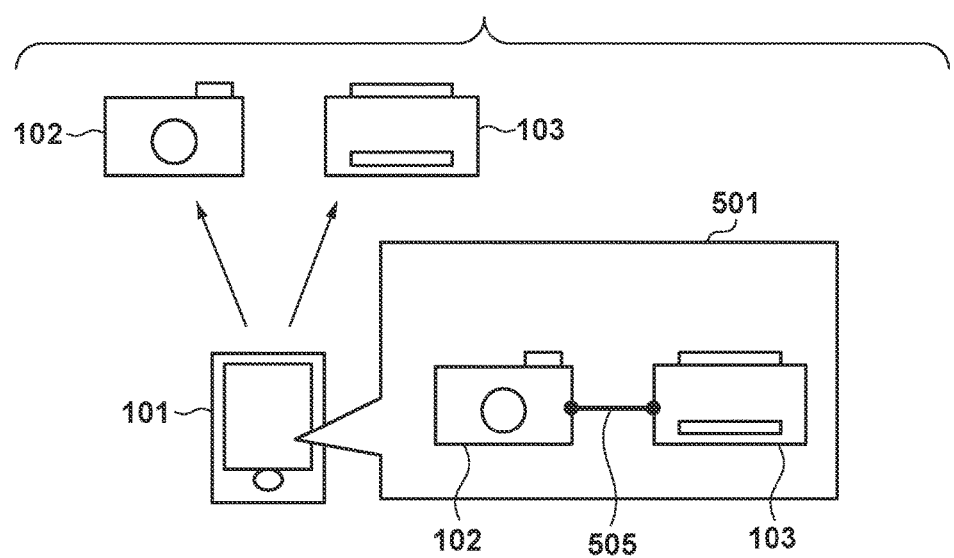

FIG. 5C shows a state after the camera 102 and the printer 103 have been connected. Reference numeral 505 indicates that the camera 102 and the printer 103 are connected. Thus, the user can simply know which devices are connected. In the present embodiment, the connection of the camera 102 and the printer 103 is indicated with a line, but this is not a limitation, and a configuration may also be adopted in which devices are surrounded by the same color, or unconnected devices are grayed out. Also, the connection type (such as Wi-Fi (registered trademark) or Bluetooth (registered trademark), and which application is being used in the connection) may be indicated by color or line type or the like. Further, the communication role (such as which has the server function and which has the client function) may be displayed. Thus, the user can simply know the present connection state from the communication apparatus 101, without checking each device.

Figure 5D:
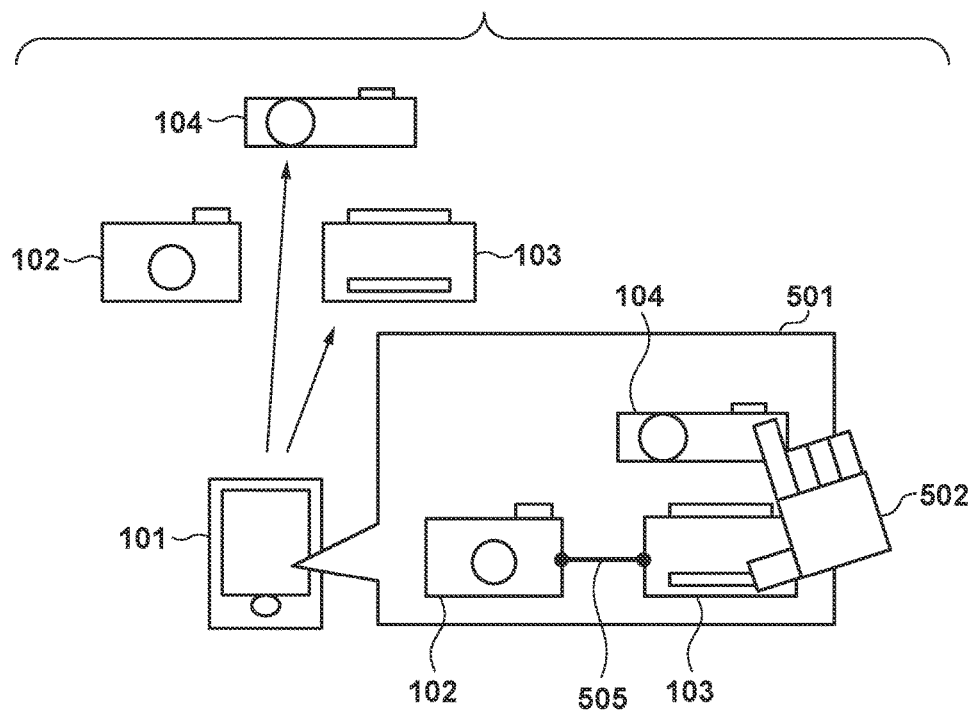

FIG. 5D shows how an instruction to connect the projector 104 to the printer 103 is given after the camera 102 and the printer 103 have been connected. The user performs a pinch in gesture on the printer 103 and the projector 104. Thus, the printer 103 and the projector 104 are connected. At this time, the camera 102, the printer 103, and the projector 104 may be connected to the same network. Also, separate networks may be formed with a group of the camera 102 and the printer 103 and a group of the printer 103 and the projector 104, or connections may be established with separate applications.

In the present embodiment, an example is described in which a connection is established between two devices, but this is not a limitation, and the present invention can also be realized when three devices have been simultaneously selected. For example, an instruction encompassing devices desired to be connected may be given using the user interface, or an instruction indicating a plurality of points may be given using the user interface. Also, in the present embodiment, the wireless connection was performed directly, but this is not a limitation, and the connection may be performed through an access point or another apparatus (for example, the cloud). Thus, the present invention can be realized regardless of the connection method or connection layer.

6. Sequence Between Devices (Connection)

Figure 6:
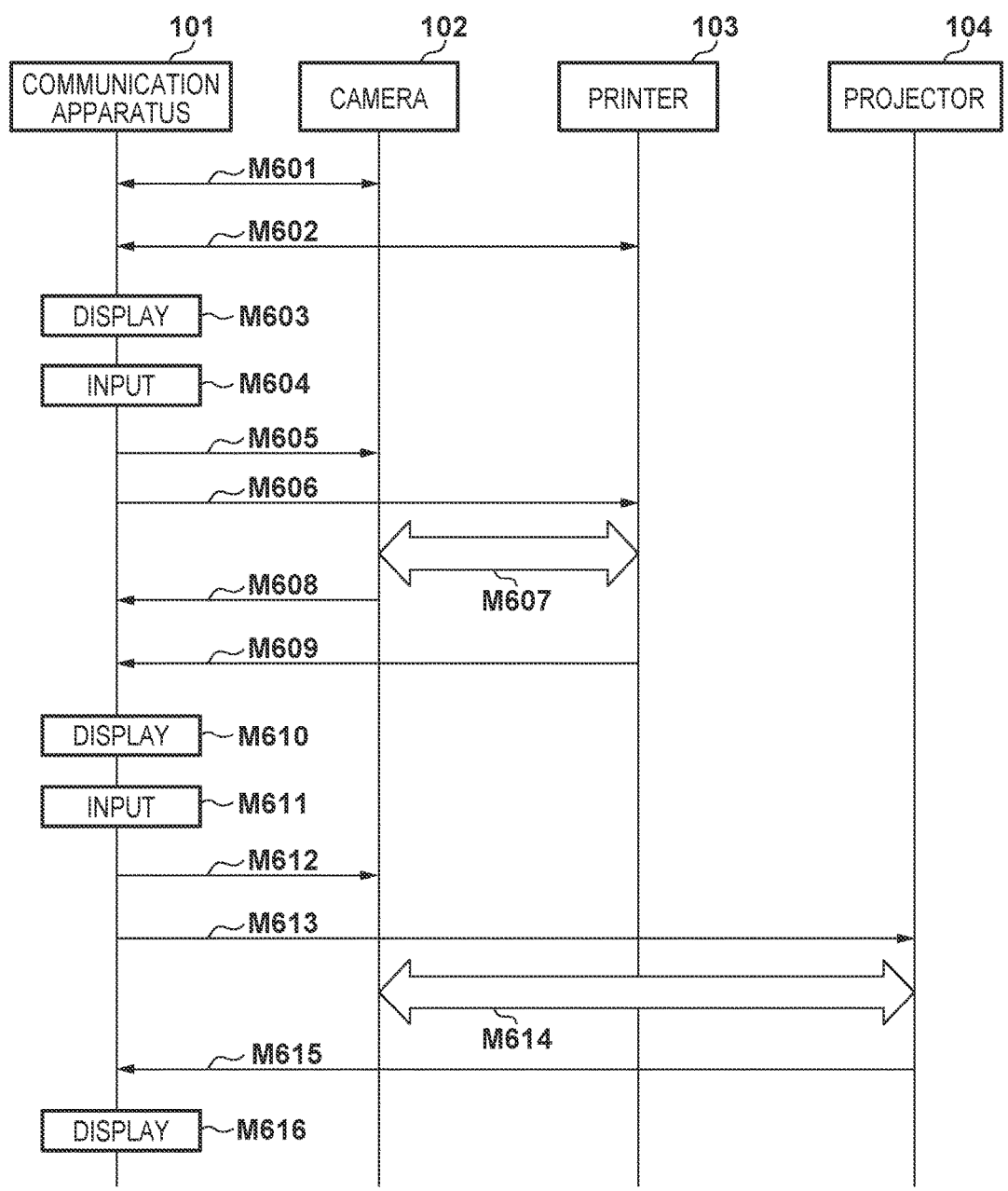
FIG. 6 shows a sequence in a case where a communication apparatus, a camera, a printer, and a projector according to an embodiment of the present invention perform connection.

FIG. 6 shows a sequence in a case of connecting the communication apparatus 101, the camera 102, the printer 103, and the projector 104. The communication apparatus 101 finds the camera 102 and the printer 103 (M601, M602). The communication apparatus 101 obtains an identifier from the camera 102 and the printer 103 through Bluetooth (registered trademark) communication or a wireless beacon. Then, the communication apparatus 101 obtains recognition information and attribute information corresponding to the identifiers from the server 105. The recognition information is an image characteristic amount or the like, for example. The communication apparatus 101 uses the recognition information to determine whether or not the camera 102 or the printer 103 is present within a shot image, and if present within the image, discriminates the region in which the camera 102 or the printer 103 is present.

The communication apparatus 101 superimposes the attribute information on the image of the discrimination result, and displays the information (M603). The communication apparatus 101 receives input from the user of information designating which device is to be connected to which device, by what sort of connection (M604). Here, it is presumed that the user gave an instruction to connect the camera 102 and the printer 103.

The communication apparatus 101 gives a connection instruction to the camera 102 and the printer 103 using Bluetooth (registered trademark) or the like, for example. The communication apparatus 101 instructs the camera 102 to connect to the printer 103 (M605). The communication apparatus 101 instructs the printer 103 to connect to the camera 102 (M606). This connection instruction includes parameters for the camera 102 and the printer 103 to establish a wireless connection, and parameters for an application connection.

After the camera 102 and the printer 103 establish a wireless connection by Wi-Fi (registered trademark), an application connection is established (M607). The camera 102 gives a notification to the communication apparatus 101 that connection is complete (M608). The printer 103 gives a notification to the communication apparatus 101 that connection is complete (M609). In a case where there is another communication apparatus that is already connected or another communication apparatus that is being monitored, notification may also be given to those communication apparatuses.

When notification is received from the camera 102 and the printer 103, the communication apparatus 101 superimposes on the screen a display indicating that the camera 102 and the printer 103 are connected (M610). The communication apparatus 101 further receives input from the user of information designating which device is to be connected to which device, by what sort of connection (M611). Here, it is presumed that the user gave an instruction to connect the camera 102 and the projector 104.

The communication apparatus 101 instructs the camera 102 to connect to the projector 104 (M612). The communication apparatus 101 instructs the projector 104 to connect to the camera 102 (M613). This connection instruction includes parameters for the camera 102 and the projector 104 to establish a wireless connection, and parameters for an application connection.

After the camera 102 and the projector 104 establish a wireless connection by Wi-Fi (registered trademark), an application connection is established (M614). The camera 102 may give a notification to the communication apparatus 101 that connection is complete, but because a network is already formed, in the present embodiment this may be omitted. The projector 104 gives a notification to the communication apparatus 101 that connection is complete (M615).

When notification is received from the camera 102 and the projector 104, the communication apparatus 101 superimposes on the screen a display indicating that the camera 102 and the projector 104 are connected (M616). In a case where the connection complete notification from the camera 102 to the communication apparatus 101 is omitted, a display indicating that the camera 102 and the projector 104 are connected may be performed based on a notification from the projector 104.

7. User Interface Example (Disconnection)

FIGS. 7A to 7D show a user interface in a case where a disconnection instruction is performed from the communication apparatus 101. Reference numeral 701 denotes a line indicating that the camera 102 and the projector 104 are connected. Reference numeral 702 denotes a line indicating that the printer 103 and the projector 104 are connected. Reference numeral 703 denotes a window that displays attribute information of the projector 104. The attribute information includes a device name, a device type, abilities, name of a network to which the device is connected, name of a service that can be used, and the like.

Figure 7A:
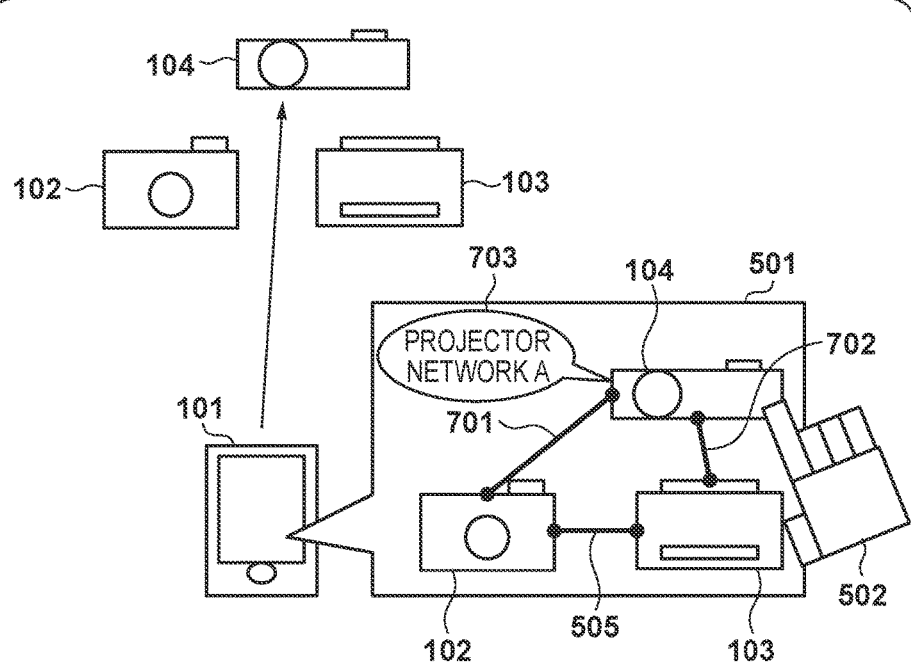
FIGS. 7A to 7D show a user interface in a case where a disconnection instruction is performed from a communication apparatus according to an embodiment of the present invention.

FIG. 7A shows how the user performs a swipe gesture on the projector 104 to give a disconnection instruction. By the hand 502 touching and then sliding the projector 104, the connection of the camera 102 and the printer 103 is disconnected. Whether to disconnect a wireless connection or an application connection may be determined according to the operation method when performing disconnection. Also, the connection with the camera 102 may be maintained by sliding the projector 104 to the side of the camera 102 among the camera 102 and the printer 103. Also, in the present embodiment an instruction to disconnect is given by a swipe gesture, but this is not a limitation, and a configuration may also be adopted in which a pinch out gesture is performed on a device desired to be disconnected, or in which disconnection is performed by obstructing a connected line. Any configuration may be adopted in which the user can instruct disconnection by some sort of instruction in this way.

Figure 7B:
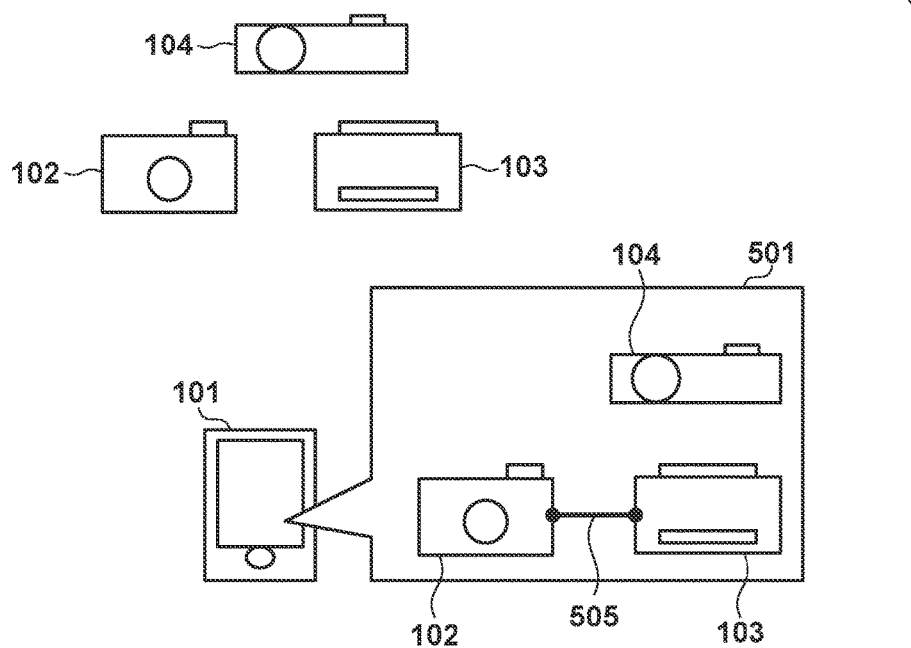
Figure 7C:
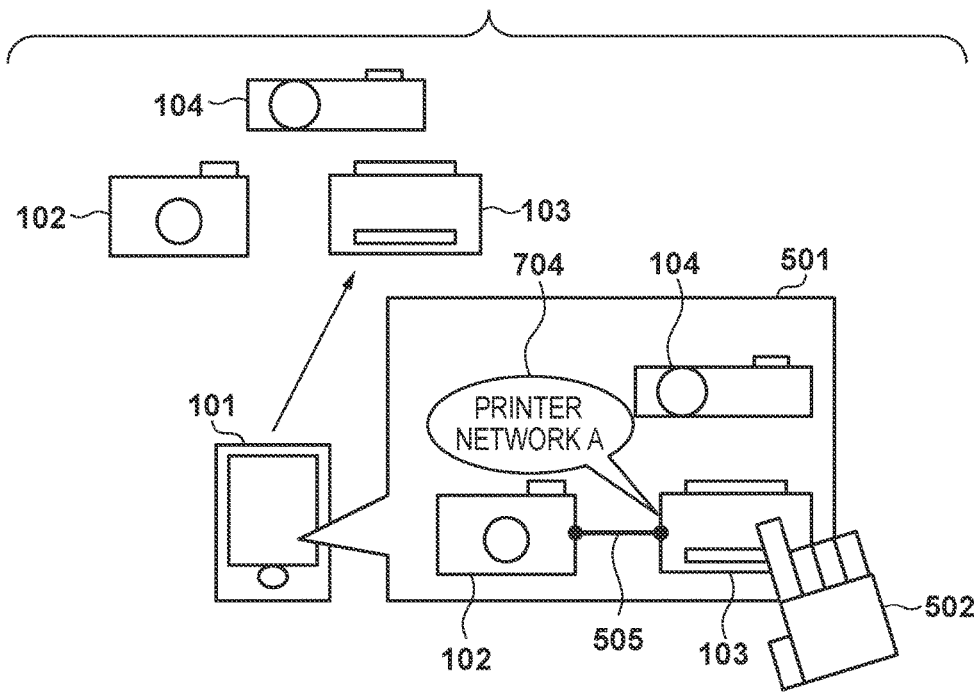
Figure 7D:
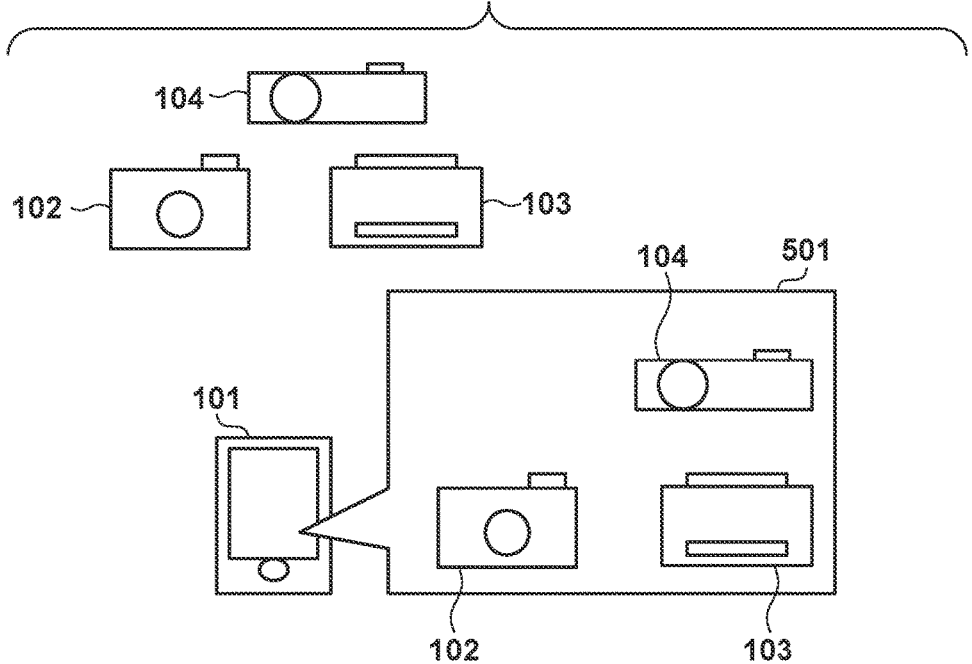

In FIG. 7B, the communication apparatus 101 received notification that the projector 104 was disconnected from the camera 102 and the printer 103, and changed the display. FIG. 7C shows how the user performed a swipe gesture on the printer 103 to give an instruction to disconnect from the camera 102. Reference numeral 704 denotes a window that displays attribute information of the printer 103. In FIG. 7D, the communication apparatus 101 received notification that the printer 103 was disconnected from the camera 102, and changed the display. Thus, the user can simply perform disconnection.

8. Sequence Between Devices (Disconnection)

Figure 8:
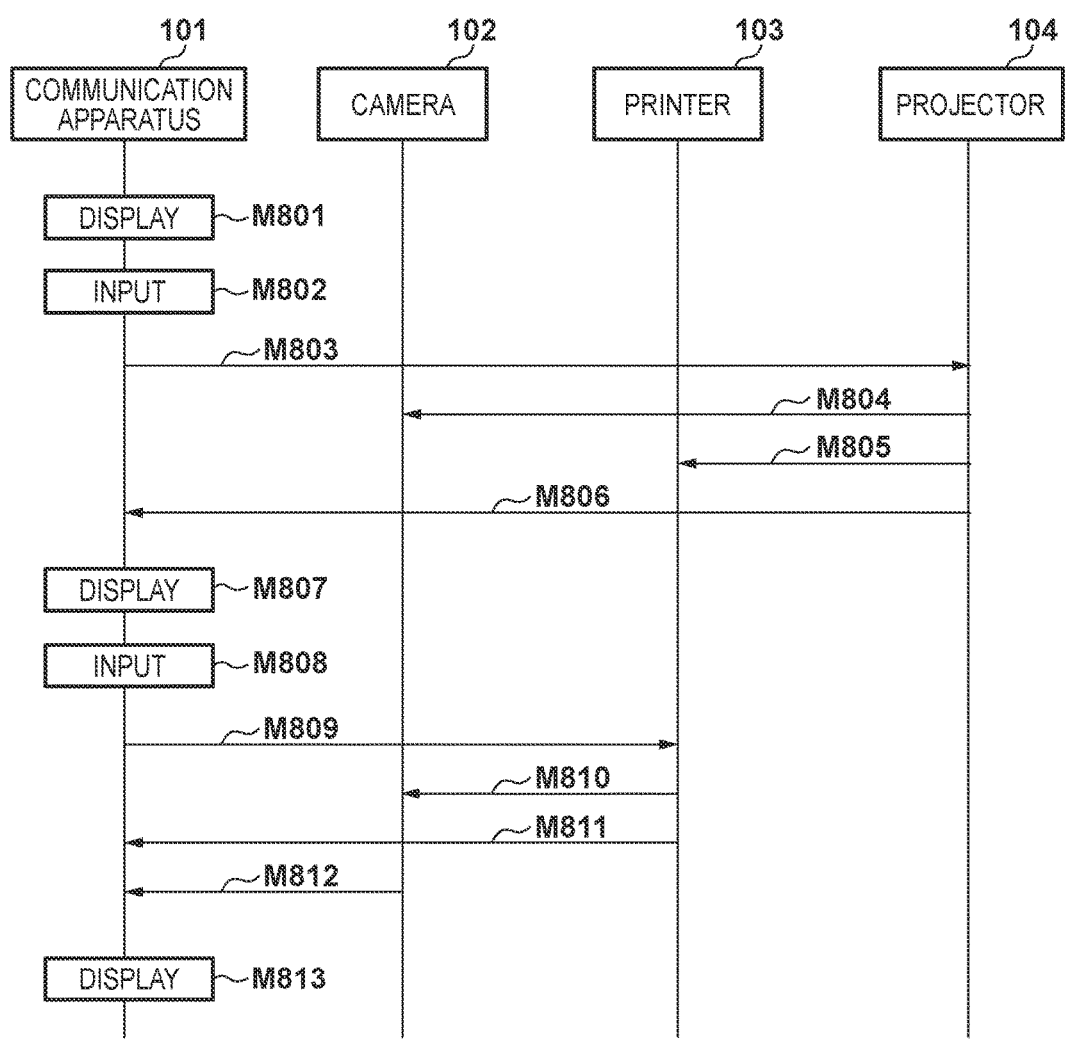
FIG. 8 shows a sequence in a case where a communication apparatus, a camera, a printer, and a projector according to one embodiment of the present invention perform disconnection.

FIG. 8 shows a sequence in a case of disconnecting the communication apparatus 101, the camera 102, the printer 103, and the projector 104. The communication apparatus 101 displays the camera 102 and the printer 103 (M801). In the present embodiment, display is performed after performing image recognition, but this is not a limitation, and a cache between devices that are already connected may be displayed on the screen. Thus, it is possible to give an instruction to disconnect between remote devices.

The user inputs an instruction for disconnecting the projector 104 from the network of the camera 102 and the printer 103 through the user interface (M802). The communication apparatus 101 gives a disconnection instruction to the projector 104 (M803).

When the disconnection instruction is received, the projector 104 transmits a disconnection request to the camera 102 and the printer 103, and performs disconnection processing (M804, M805). The disconnection performed at this time is application disconnection, wireless disconnection, or the like. For example, a configuration may be adopted in which, in a case such as when the projector 104 was connected to a network before receiving a disconnection instruction, only application disconnection is performed, and wireless disconnection is not performed. Thus, it is not absolutely necessary to perform wireless disconnection, and so an arbitrary disconnection instruction can be performed. Also, processing may be performed such that wireless disconnection from the camera 102 is performed, but wireless disconnection from the printer 103 is not performed, for example.

The projector 104 notifies the communication apparatus 101 that disconnection was completed through Bluetooth (registered trademark), the cloud, or the like (M806). The communication apparatus 101 performs display indicating that the projector 104 has been disconnected from the camera 102 and the printer 103, reflected in the screen (M807).

The user inputs an instruction for disconnecting the printer 103 from the network of the camera 102 through the user interface (M808). The communication apparatus 101 gives a disconnection instruction to the printer 103 (M809). When the disconnection instruction is received, the printer 103 transmits a disconnection request to the camera 102, and performs disconnection processing (M810). A configuration may also be adopted in which when the camera 102 determines that a connected device is no longer present, network ending processing to separate from an access point, end an ad hoc network, or the like is performed.

The printer 103, like the projector 104, notifies the communication apparatus 101 that disconnection was completed (M811). Note that the camera 102 also notifies the communication apparatus 101 that disconnection was completed (M812). The communication apparatus 101 performs display indicating that the camera 102 and the printer 103 have been disconnected, reflected in the screen (M813).

9. Processing Executed by Each Device

Figure 9:
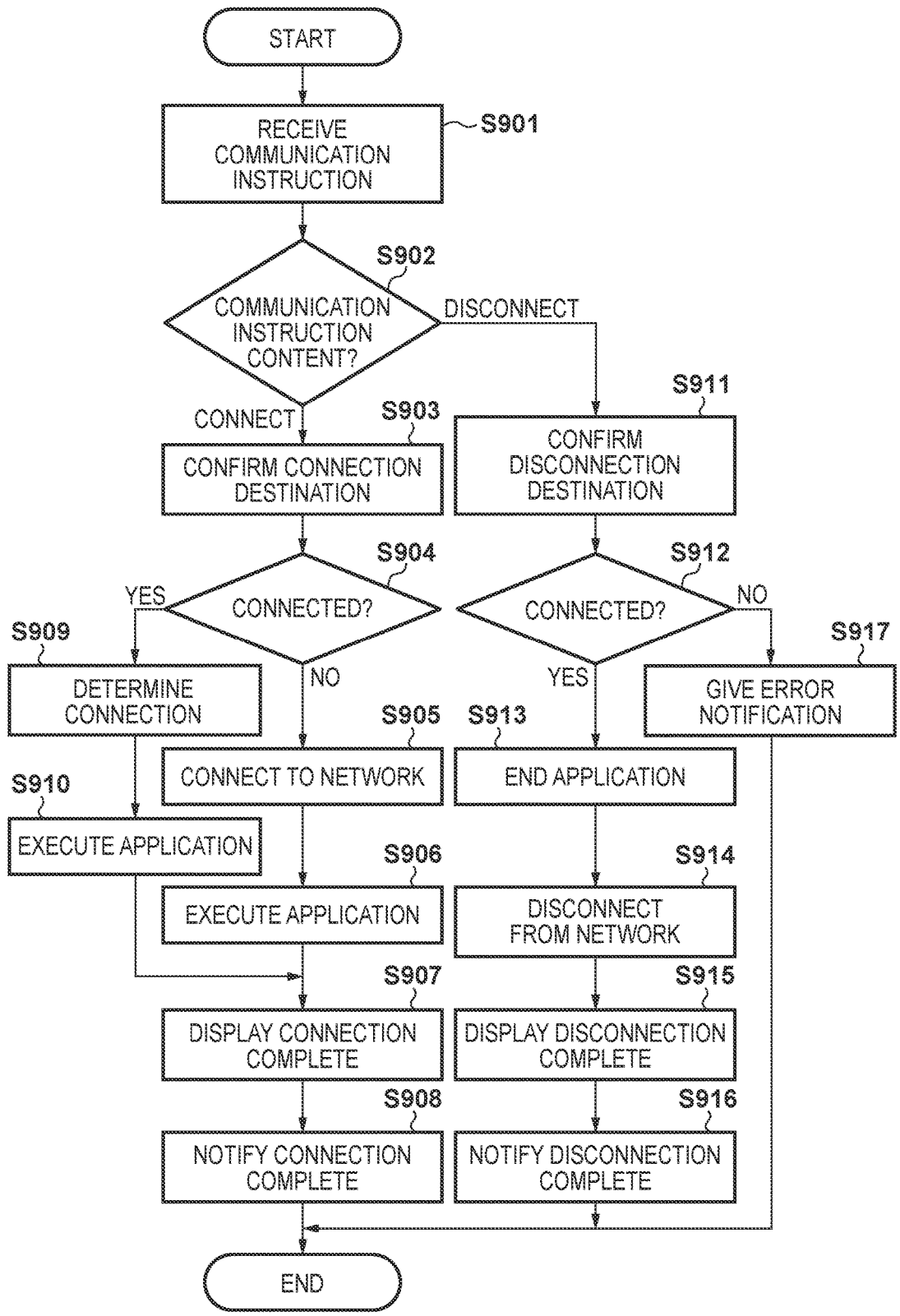
FIG. 9 is a flowchart that shows a processing procedure when a camera, a printer, and a projector according to an embodiment of the present invention have received a communication instruction from a communication apparatus.

FIG. 9 is a flowchart that shows a processing procedure when the camera 102, the printer 103, and the projector 104 have received a communication instruction from the communication apparatus 101. Here, an example is described in which the camera 102 received an instruction from the communication apparatus 101.

The communication instruction receiving unit 303 receives a communication instruction from the communication apparatus 101 through the communication unit 301 (Step S901). The communication instruction receiving unit 303 determines whether the content of the received communication instruction indicates connection or disconnection (Step S902). When the communication instruction receiving unit 303 determines that the content of the communication instruction indicates connection, the communication instruction receiving unit 303 obtains information related to the connection destination included in the communication instruction content (Step S903). As the information used here, information being held in the camera 102 may be used, information may be obtained from the server 105, or information included in the communication instruction transmitted from the communication apparatus 101 may be used.

The communication instruction receiving unit 303 determines whether or not the connection destination has been connected to the network, based on the result of checking the connection destination (Step S904). When the communication instruction receiving unit 303 determines that the connection destination has been connected to the network, processing proceeds to Step S909. When the communication instruction receiving unit 303 determines that the connection destination has not been connected to the network, processing proceeds to Step S905.

The communication execution unit 304 establishes a network connection with a communication counterpart that was designated by the communication instruction, through a wireless direction connection or the like, for example (Step S905). Here, a wireless direction connection is cited as an example of the network connection, but this is not a limitation, and a connection to the same access point by an infrastructure mode may be established, or a connection may be established through the cloud, a relay server, a portable telephone, or the like. When a communication method has been designated in the communication instruction, that communication method may be followed. Also, in a case where communication roles (server or client, or sink or source) have been designated, those roles may be followed. When those roles cannot be followed, a connection may be established after changing the communication roles.

The communication execution unit 304 starts an application connection with the communication counterpart that was designated by the communication instruction (Step S906). When an application type or settings information have been designated in the communication instruction, they may be followed. Also, when an application role has been designated, that role may be followed. When the application role cannot be followed, a connection may be established after changing the application role. When network connection is complete and application execution is started, the display unit 305 performs display indicating that connection is complete (Step S907).

On the other hand, when present in the same network as the communication counterpart that was designated by the communication instruction, the communication execution unit 304 executes a protocol for discovery (such as SSDP or mDNS), and performs a connection determination (Step S909). The communication execution unit 304 starts an application connection with the communication counterpart that was designated by the communication instruction (Step S910; same processing as Step S906).

The notification transmitting unit 306 notifies the communication apparatus 101 that connection was completed (Step S908). Note that although not shown in this flowchart, when network connection and application execution failed, the display unit 305 displays an error indicating content of the failure. The error may also be expressed by not only a display but also an error sound, a flashing light, a vibration, or the like. Further, the notification transmitting unit 306 notifies the communication apparatus 101 of the connection failure.

Also, at least part of the processing for network connection, discovery, and application execution may be omitted, and for example, discovery processing as in Step S909 may be added between Steps S905 and S906.

On the other hand, when the communication instruction receiving unit 303 determines that the content of the communication instruction indicates disconnection, the communication instruction receiving unit 303 checks the disconnection destination (Step S911). As the information used here, information being held in the camera 102 may be used, information may be obtained from the server 105, or information included in the communication instruction transmitted from the communication apparatus 101 may be used.

The communication instruction receiving unit 303 determines whether or not the disconnection destination has been connected to the network, based on the result of checking the disconnection destination (Step S912). When the communication instruction receiving unit 303 determines that the disconnection destination has been connected to the network, processing proceeds to Step S913. When the communication instruction receiving unit 303 determines that the disconnection destination has not been connected to the network, processing proceeds to Step S917.

In the present embodiment, only the network connection state is determined, but this is not a limitation, and processing may also include a determination of whether the content of the connection instruction indicates application disconnection or network disconnection. For example, a configuration may be adopted in which, in a case where the content of the connection instruction indicates network disconnection, it is necessary to disconnect the network even if the application has already ended, so Step S914 is skipped, and processing is started from Step S915. Also, in this case, the application has already ended, so error display and error notification may further be performed.

The communication execution unit 304 performs application ending processing according to the communication instruction content (Step S913). The communication execution unit 304 may further perform processing to end a discovery protocol such as SSDP. The communication execution unit 304 disconnects from the target network according to the communication instruction content (Step S914). For example, when a wireless direct connection has been established, the connection with a target device is disconnected. The display unit 305 performs display indicating that application disconnection and network disconnection have been completed (Step S915). In the present embodiment, both application disconnection and network disconnection are executed, but this is not a limitation, and both or one of these may be executed.

The notification transmitting unit 306 notifies the communication apparatus 101 that disconnection has been completed (Step S916). After the display unit 305 displays an error, the notification transmitting unit 306 notifies the communication apparatus 101 with an error indicating that the target to be disconnected was not present (Step S917).

Note that although not shown in this flowchart, a modified example of error notification is possible. For example, in a case where application ending or disconnection from a network are not possible due to a security policy or the like of the camera 102, an error indicating impossibility may be displayed, and transmitted to the communication apparatus 101.

As described above, according to the present embodiment, the user can simply execute application connection and disconnection, and network connection and disconnection, with respect to a desired device. Also, in a case where application connection and disconnection, and network connection and disconnection, could not be executed, by viewing an error display the user can know the reason that processing according to the user's instruction could not be realized. By giving notification that connection and disconnection are complete, or error notification, to the communication apparatus 101, it is possible to confirm whether a communication instruction could be executed without operating the device that gave the communication instruction.

Also, in a case where devices that gave a communication instruction are already connected to each other, it is possible to skip part of the communication instruction, so processing for a connection can be reduced. In a case where devices that gave a communication instruction are already connected to each other over a network, it is possible to return to the same state as before giving the communication instruction by not executing part of the disconnection processing.

Embodiment 2

Figure 10:
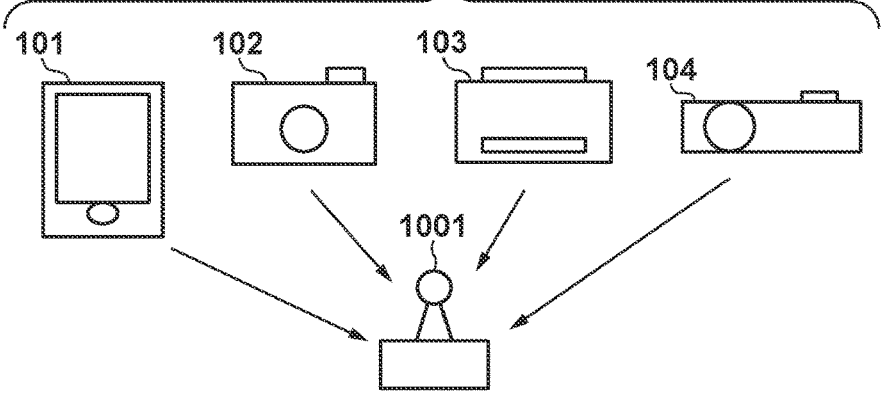
FIG. 10 shows the manner in which a communications apparatus, a camera, a printer, and a projector according to an embodiment of the present invention are connected through an access point.

In Embodiment 2, mainly differences from Embodiment 1 will be described. FIG. 10 shows the manner in which the communications apparatus 101, the camera 102, the printer 103, and the projector 104 are connected through an access point 1001 that functions as a relay apparatus.

The communications apparatus 101, the camera 102, and the printer 103 are already connected to the access point 1001. The communication instructions (M605, M606) described in Embodiment 1 include discovery of an application layer because connection through the access point 1001 is already complete. Also, in the disconnection instruction (M809), application layer separation processing (M810, M811) is performed, and disconnection from the access point 1001 is not performed.

The projector 104 in the present embodiment is not connected to the access point 1001. The communication instruction (M613) includes information of the connection to the access point 1001, and discovery of the application layer. Also, with the disconnection instruction, after performing application layer separation processing (M804 and M805), the projector 104 disconnects from the access point 1001, and transmits notification that disconnection has been completed in M806.

As described above, in the present embodiment, in a case where at least one among one or more other communication apparatuses is already connected to a relay apparatus, another of the other communication apparatuses is instructed to connect to the relay apparatus. Thus, the present invention is also applicable to communication through another device as in the case of an infrastructure mode. Also, with a disconnection instruction, it is possible to return to the same network connection state (a state connected to the access point 1001, after performing application layer separation).

Embodiment 3

Figure 11A:
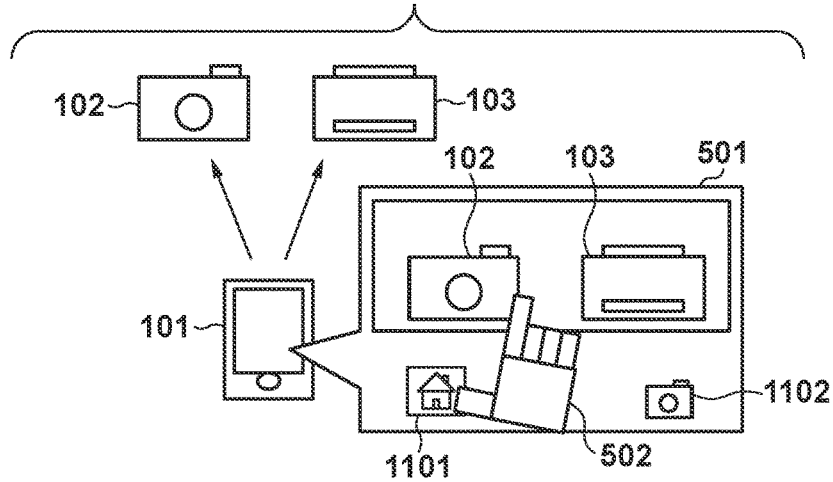
FIGS. 11A and 11B show a user interface in a case where a connection instruction is performed from a communication apparatus according to an embodiment of the present invention.
Figure 11B:
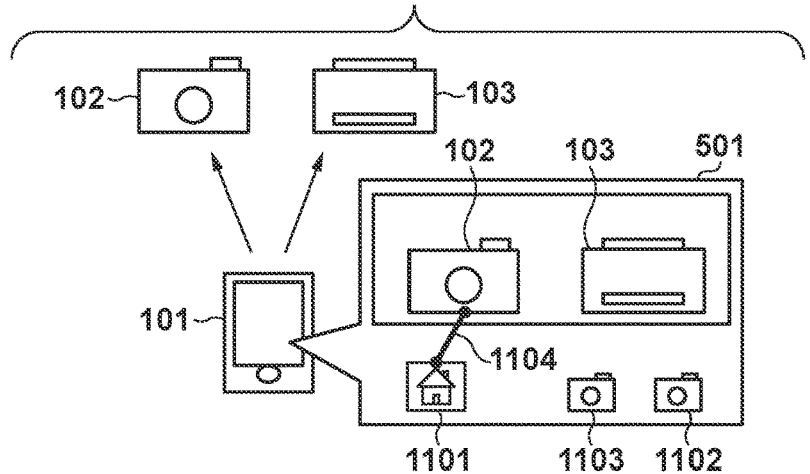

In Embodiment 3, mainly differences from Embodiment 1 will be described. FIGS. 11A and 11B show an example of a user interface in a case where a connection instruction is performed from the communication apparatus 101. With the user interface of the present embodiment, it is possible to connect to a remotely located storage or camera.

Reference numeral 1101 denotes an icon that indicates a storage connected to a home network. Information associated with the icon may be displayed in a superimposed manner, or may be displayed emphasized by color, lines, or the like. Reference numeral 1102 denotes a remote camera that is connected to the network. Reference numeral 1103 also denotes a remote camera that is connected to the network. The user or the system has set a connection method associated with the icon in the communication apparatus 101. For example, a device that is not present in a shot image but has already been set may be displayed as an icon, or a device for which an identifier has been obtained by the identification information obtaining unit 209 but that is not present in a shot image may be displayed as an icon.

FIG. 11A shows the hand 502 giving a connection instruction by performing a pinch in gesture on the camera 102 and a storage 1101. Thus, it is possible to simply connect a remote device to a device existing in front of the user. FIG. 11B shows a state in which connection of the camera 102 to the storage 1101 is completed. Reference numeral 1104 denotes a line indicating that the camera 102 and the storage 1101 are connected.

As described above, according to the present embodiment, it is possible to simply give an instruction to connect to a device that is not present in a shot image.

Embodiment 4

A configuration may also be adopted in which even though a plurality of other apparatuses that are targets of connection or disconnection are not present within a single angle of view, by moving a shooting range of the communication apparatus, a shot image is obtained, and the plurality of other apparatuses are recognized. Thus, it is possible to simply connect or disconnect even between a plurality of other apparatuses in locations that are not present within a single angle of view.

Note that as the method of moving the shooting range, the user may move the communication apparatus, or an image capturing unit provided in the communication apparatus may move automatically. Also, one image may be obtained by moving the shooting range, or a plurality of images may be obtained. In the case of a plurality of images, only an image in which another apparatus was recognized is shown to the user, and the user is prompted to perform an operation. Thus, even in a case where a plurality of images were shot, when the user performs an operation, a plurality of other apparatuses that are targets of connection or disconnection can be discovered simply, and so convenience of the user improves.

Also, a plurality of images may be shot instead of moving the shooting range. In this case, a configuration may be adopted in which connection or disconnection is instructed if shooting is performed within a predetermined time period, and connection or disconnection is not instructed if shooting is performed outside of that time period. Also, a configuration may be adopted in which connection or disconnection is instructed if the shooting location is within a predetermined range, and connection or disconnection is not instructed if the shooting location is outside of the predetermined range. Thus, it is possible to reduce the possibility that unintended apparatuses will be connected to or disconnected from each other.

Also, a configuration may also be adopted in which, in one or a plurality of shot images, when a plurality of other apparatuses have been recognized, connection or disconnection are instructed without a user operation of a pinch in gesture or a pinch out gesture. At this time, user operation may be omitted in a case where two other apparatuses have been recognized, and prompted in a case where three or more other apparatuses have been recognized. Alternatively, a configuration may be adopted in which an error is reported in a case where three or more other apparatuses have been recognized. By omitting user operation, user convenience further improves.

According to the present invention, it is possible for desired communication apparatuses to be simply connected to each other or disconnected from each other.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-116026, filed Jun. 8, 2015, which is hereby incorporated by reference herein in its entirety.

What is claimed is:

1. A communication apparatus, comprising:
one or more processors; and
one or more memories storing instructions which, when executed by the one or more processors, cause the communication apparatus to:
obtain a captured image;
perform recognition processing for recognizing another communication apparatus from the captured image;
in a case where a plurality of other communication apparatuses are recognized by the recognition processing and a connection instruction to the plurality of recognized other communication apparatuses is performed from a user, transmit a signal for enabling the plurality of recognized other communication apparatuses to connect in an application layer for each other via a wireless connection; and
in a case where a plurality of other communication apparatuses are recognized by the recognition processing and a disconnection instruction to the plurality of recognized other communication apparatuses is performed from a user,
i) transmit a signal for disconnecting the connection in the application layer between the plurality of recognized other communication apparatuses, so that the wireless connection between the plurality of recognized other communication apparatuses is maintained, in a case where the wireless connection between the plurality of recognized other communication apparatuses has been already established at a timing that the connection instruction is performed to the plurality of recognized other communication apparatuses, and ii) transmit a signal for disconnecting the connection in the application layer and the wireless connection between the plurality of recognized other communication apparatuses, in a case where the wireless connection between the plurality of recognized other communication apparatuses has not been established at a timing that the connection instruction is performed to the plurality of recognized other communication apparatuses.

2. The communication apparatus according to claim 1, wherein the one or more memories store further instructions, which, when executed by the one or more processors, further cause the communication apparatus to:

allow a user to input a user operation designating the plurality of recognized other communication apparatuses.

3. The communication apparatus according to claim 1, wherein the one or more memories store further instructions, which, when executed by the one or more processors, further cause the communication apparatus to:

receive a predetermined notification from each of the plurality of recognized other communication apparatuses; and cause content of the predetermined notification to be displayed.

4. The communication apparatus according to claim 3, wherein the predetermined notification is a notification indicating a connection state of the plurality of recognized other communication apparatuses.

5. The communication apparatus according to claim 1, further comprising an image capturing unit, wherein the obtained captured image is captured by the image capturing unit.

6. The communication apparatus according to claim 1, wherein the one or more memories store further instructions, which, when executed by the one or more processors, further cause the communication apparatus to obtain identification information used in the recognition processing from the captured image.

7. The communication apparatus according to claim 1, wherein the one or more memories store further instructions, which, when executed by the one or more processors, further cause the communication apparatus to determine which among the plurality of other recognized communication apparatuses will serve as an apparatus that forms a wireless network.

8. The communication apparatus according to claim 7, wherein the one or more memories store further instructions, which, when executed by the one or more processors, further cause the communication apparatus to allow a user to input a predetermined operation designating a plurality of other recognized communication apparatuses, wherein an apparatus that forms a wireless network is determined based on an order in which the user designated other recognized communication apparatuses.

9. The communication apparatus according to claim 1, wherein the one or more memories store further instructions, which, when executed by the one or more processors, further cause the communication apparatus to, in a case where a plurality of other communication apparatuses are recognized by the recognition processing and a connection instruction to the plurality of recognized other communication apparatuses is performed from a user, transmit to the plurality of recognized other communication apparatuses a signal for the plurality of recognized other communication apparatuses performing the wireless connection for each other.

10. The communication apparatus according to claim 1, wherein the one or more memories store further instructions, which, when executed by the one or more processors, further cause the communication apparatus to, determine the number of the other communication apparatuses recognized by the recognition processing; and in a case where it is determined that the number of the other communication apparatuses recognized by the recognition processing is one, and a connection instruction to the recognized one communication apparatus is performed from a user, transmit to the recognized one communication apparatus a signal for the recognized one other communication apparatus and the communication apparatus performing a wireless connection and/or a connection in an application layer for each other.

11. The communication apparatus according to claim 1, wherein the one or more memories store further instructions, which, when executed by the one or more processors, further cause the communication apparatus to:

determine the number of the other communication apparatuses recognized by the recognition processing; and in a case where it is determined that the number of other communication apparatuses recognized by the recognition processing is one, and a disconnection instruction to the recognized one communication apparatus is performed from a user, transmit to the recognized one communication apparatus a signal for disconnecting a wireless connection and/or a connection in an application layer between the recognized one other communication apparatus and the communication apparatus.

12. The communication apparatus according to claim 1, wherein the one or more memories store further instructions, which, when executed by the one or more processors, further cause the communication apparatus to notify an error in a case where three or more other communication apparatuses are recognized by the recognition processing.

13. The communication apparatus according to claim 1, wherein the connection instruction is performed by at least one of pinch in, drag and drop, or touch.

14. The communication apparatus according to claim 1, wherein the disconnection instruction is performed by at least one of pinch in, drag and drop, or touch.

15. The communication apparatus according to claim 1, wherein the recognition processing is performed using image characteristic amount information of the captured image.

16. A method for controlling a first communication apparatus, comprising:

obtaining, by the first communication apparatus, a captured image;

performing recognition processing for recognizing, by the first communication apparatus, another communication apparatus from the captured image;

in a case where a plurality of other communication apparatuses are recognized by the recognition processing and a connection instruction to the plurality of recognized other communication apparatuses is performed from a user, transmitting, by the first communication apparatus, a signal for enabling the plurality of recognized other communication apparatuses to connect in an application layer for each other via a wireless connection; and in a case where a plurality of other communication apparatuses are recognized by the recognition processing and a disconnection instruction to the plurality of recognized other communication apparatuses is performed from a user,
- i) transmitting a signal for disconnecting the connection in the application layer between the plurality of recognized other communication apparatuses, so that the wireless connection between the plurality of recognized other communication apparatuses is maintained, in a case where the wireless connection between the plurality of recognized other communication apparatuses has been already established at a timing that the connection instruction is performed to the plurality of recognized other communication apparatuses, and
- ii) transmitting a signal for disconnecting the connection in the application layer and the wireless connection between the plurality of recognized other communication apparatuses, in a case where the wireless connection between the plurality of recognized other communication apparatuses has not been established at a timing that the connection instruction is performed to the plurality of recognized other communication apparatuses.

17. A non-transitory computer-readable storage medium storing a computer program for causing a computer to execute a method for controlling a communication apparatus, the method comprising:

obtaining a captured image;

performing recognition processing for recognizing another communication apparatus from the captured image;

in a case where a plurality of other communication apparatuses are recognized by the recognition processing and a connection instruction to the plurality of recognized other communication apparatuses is performed from a user, transmitting a signal for enabling the plurality of recognized other communication apparatuses to connect in an application layer for each other via a wireless connection; and in a case where a plurality of other communication apparatuses are recognized by the recognition processing and a disconnection instruction to the plurality of recognized other communication apparatuses is performed from a user,
- i) transmitting a signal for disconnecting the connection in the application layer between the plurality of recognized other communication apparatuses, so that the wireless connection between the plurality of recognized other communication apparatuses is maintained, in a case where the wireless connection between the plurality of recognized other communication apparatuses has been already established at a timing that the connection instruction is performed to the plurality of recognized other communication apparatuses, and
- ii) transmitting a signal for disconnecting the connection in the application layer and the wireless connection between the plurality of recognized other communication apparatuses, in a case where the wireless connection between the plurality of recognized other communication apparatuses has not been established at a timing that the connection instruction is performed to the plurality of recognized other communication apparatuses.

* * * * *